(12) United States Patent
Romero et al.

(10) Patent No.: US 9,226,609 B2
(45) Date of Patent: Jan. 5, 2016

(54) MULTI-PURPOSE COOKING DEVICE THROUGH HEATING OF A WATER BATH

(75) Inventors: Emmanuel Romero, Saint Marcel les Annonay (FR); Yves Lubrina, Chaussenans (FR)

(73) Assignee: THIRODE GRANDES CUISINES POLIGNY "TGCP", Poligny (FR)

( * ) Notice: Subject to any disclaimer, the term of this patent is extended or adjusted under 35 U.S.C. 154(b) by 808 days.

(21) Appl. No.: 12/918,543

(22) PCT Filed: Mar. 3, 2009

(86) PCT No.: PCT/IB2009/050865
§ 371 (c)(1),
(2), (4) Date: Aug. 20, 2010

(87) PCT Pub. No.: WO2009/109920
PCT Pub. Date: Sep. 11, 2009

(65) Prior Publication Data
US 2010/0326286 A1   Dec. 30, 2010

(30) Foreign Application Priority Data

Mar. 4, 2008 (FR) ...................... 08 01188

(51) Int. Cl.
*A47J 27/00* (2006.01)
*A47J 37/12* (2006.01)
(Continued)

(52) U.S. Cl.
CPC *A47J 27/18* (2013.01); *A47J 27/62* (2013.01); *A47J 36/20* (2013.01); *A47J 37/1295* (2013.01)

(58) Field of Classification Search
CPC ........... A47J 27/62; A47J 27/18; A47J 27/04; A47J 27/60; A47J 37/1214; A47J 37/1295; A47J 36/20; A23L 3/04; A23L 3/365; A21B 1/48; A23B 4/052

USPC ....... 99/325, 330, 470, 443 C, 477, 404, 483, 99/403, 410, 415, 418
See application file for complete search history.

(56) References Cited

U.S. PATENT DOCUMENTS 3,332,338 A * 7/1967 Wein ................................ 99/330
4,189,504 A * 2/1980 Jimenez ......................... 426/508
(Continued)

FOREIGN PATENT DOCUMENTS

| DE | 3610124 C1 | 7/1987 |
| EP | 0334782 A1 | 9/1989 |
| FR | 2682582 A1 | 4/1993 |

OTHER PUBLICATIONS

ISR for PCT/IB2009/050865 mailed Jun. 3, 2009.
(Continued)

*Primary Examiner* — Dana Ross
*Assistant Examiner* — Hemant Mathew
(74) *Attorney, Agent, or Firm* — Hauptman Ham, LLP

(57) ABSTRACT

The device of this invention is a multi-purpose cooking device through heating of a water bath. It comprises means arranged so as to contain a water bath, means for heating the bath water and means for controlling the heating power, arranged so as to provide for cooking foodstuffs through immersion or steam cooking. The device further comprises means for controlling the temperature of the bath water and means for homogenizing the bath water for providing for a low temperature cooking operation. According to this invention, a single device could be used both for cooking through immersion into a (boiling) water bath, for steam cooking and for low temperature cooking.

16 Claims, 1 Drawing Sheet

(51) Int. Cl.
*A47J 27/18* (2006.01)
*A47J 27/62* (2006.01)
*A47J 36/20* (2006.01)

(56) References Cited

U.S. PATENT DOCUMENTS

| | | | | |
|---|---|---|---|---|
| 4,739,140 A | * | 4/1988 | Reznik | 219/771 |
| 4,793,324 A | * | 12/1988 | Caferro | 126/369 |
| 4,796,523 A | | 1/1989 | Mette | |
| 4,839,503 A | * | 6/1989 | Wolf et al. | 219/497 |
| 4,942,810 A | * | 7/1990 | Zittel et al. | 99/477 |
| 5,123,337 A | * | 6/1992 | Vilgrain et al. | 99/483 |
| 5,189,948 A | * | 3/1993 | Liebermann | 99/443 C |
| 5,281,426 A | * | 1/1994 | Pardo | 426/232 |
| 5,542,344 A | * | 8/1996 | Koether et al. | 99/330 |
| 6,058,926 A | * | 5/2000 | Ruiz | 126/33 |
| 6,455,085 B1 | * | 9/2002 | Duta | 426/233 |
| 2005/0072315 A1 | * | 4/2005 | Romero | 99/403 |

OTHER PUBLICATIONS

French Search Report for FR0801188 dated Jul. 21, 2008.

* cited by examiner

MULTI-PURPOSE COOKING DEVICE THROUGH HEATING OF A WATER BATH

RELATED APPLICATIONS

The present application is based on International Application Number PCT/IB/2009/050865, filed March 3, 2009, and claims priority from, French Application Number 0801188, filed March 4, 2008, the disclosures of which are hereby incorporated by reference herein in their entirety.

This invention relates to a device for cooking by heating a water bath.

A kitchen and more particularly, a professional kitchen in a restaurant for example, comprise numerous devices for cooking foodstuffs. They include, more particularly, devices for heating kitchenware, such as saucepans or frying pans, ovens and devices with a vessel allowing to cook by heating a liquid bath (for example a water bath or an oil bath); in the latter type of device, cooking could be achieved immerging the foodstuffs to be cooked into a liquid bath or through steam heating (generated by boiling water in the vessel). Such cooking devices are generally intended for a professional use; indeed, for a domestic use, a simple saucepan filled with heated water is used for immersion cooking or for steam cooking.

A permanent problem in kitchens is the lack of space. Indeed, there is a trend to increasingly dedicating kitchenware and their heating devices, even there is a trend to allocating to each type of kitchenware, of foodstuff or even cooking mode, a particular heating device. This increases the number of cooking devices and correspondingly reduces the free space in the kitchen Cooking devices by heating a liquid bath thus include devices adapted for steam cooking foodstuffs, devices adapted for cooking foodstuffs in boiling oil, devices adapted for cooking foodstuffs in boiling water and devices adapted for cooking foodstuffs through immersion into a water bath for a so-called "low temperature" cooking.

The low temperature cooking is a cooking technique, from the food processing industry, developing more and more for professional cooking (gastronomic restaurants, company canteens, etc.). It is based on cooking foodstuffs through immersion into a bath at a controlled temperature, lower than the boiling temperature, for some period of time. Indeed, as this will be explained further in detail later, the cooking effect ("rare", "done", etc.) of a foodstuff does not depend on the temperature it reaches, but on the time during which it remains at such a temperature; immerging a foodstuff for a long period of time into a water bath at a given temperature ensures its cooking state.

The French patent FR 2 652 732 discloses a device for cooking foodstuffs in oil, heated at 180° by a gas generator, said device comprising a recirculation pump allowing to accelerate thermal exchanges between the oil and the gas generator, in order to prevent the oil from being overheated. Furthermore, the oil circulation ensures a very rapid exchange at the level of foodstuffs, increasing the yield of the device and hence, its production. Such a device is only adapted for cooking foodstuffs in boiling oil. In particular, it is not adapted for water cooking and its specific means are specifically aimed at solving problems relating to the oil (maintenance of the oil quality by avoiding submitting the latter to too high temperatures, etc.). If it is desired to cook foodstuffs in a boiling water bath, at a low temperature or using steam, another device should be used.

The aim of the invention is to provide a cooking device by heating a water bath, combining a plurality of functions occupying a minimal space.

To this end, this invention relates to a multi-purpose cooking device by heating a water bath, comprising means arranged so as to contain a water bath, means for heating the bath water and means for controlling the heat power, arranged so as to allow foodstuffs to be cooked through immersion or using steam, characterized in that it further comprises means for controlling the temperature of the bath water and means for homogenizing the bath water for allowing for a low temperature cooking.

According to this invention, a single device could be used both for cooking through immersion into a boiling water bath, for steam cooking and for low temperature cooking. Such a triple function is achieved by the device because of the presence, on the one hand, of means for controlling the heat power, on the other hand, of means for controlling the temperature of the bath and means for homogenizing said bath. The device is thus multi-purpose in that it allows all cooking modes through heating a water bath.

According to a preferred embodiment, the device comprises means for controlling the control means and the homogenization means.

According to a preferred embodiment, means for controlling the temperature of the bath water comprise means for measuring the temperature of the bath water and means for heating the bath water, connected to the control means.

According to a preferred embodiment, means for homogenizing the bath water comprise a pump for homogenizing the bath water, connected to the control means.

According to a preferred embodiment, the device comprises means for measuring the temperature for medium cooking the foodstuffs to be cooked, connected to the control means.

According to a preferred embodiment, the device comprises a circuit for controlling the device, comprising the controlling means.

According to a preferred embodiment, the device comprises means for selecting a cooking mode and means for setting a parameter of the selected cooking mode.

According to a preferred embodiment in such a case, means for selecting a cooking mode are arranged so as to choose between at least one first cooking mode, with setting of the power of the heating means and one second cooking mode with setting of the level of the temperature of the water bath.

According to a preferred embodiment, the device comprises means for selecting at least one parameter allowing for the end of the cooking to be controlled.

According to a preferred embodiment in such a case, the parameter is the temperature to be reached for medium cooking the foodstuffs to be cooked in the device or the cooking time.

This invention will be better understood with the help of the following description of the preferred embodiment of the device of this invention, referring to the accompanied drawings in which.

Figure 1:
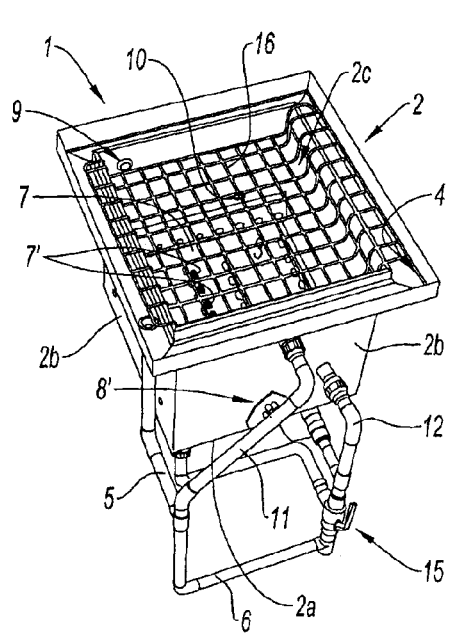
FIG. 1 illustrates a top perspective view of the preferred embodiment of the cooking device of the invention.
Figure 2:
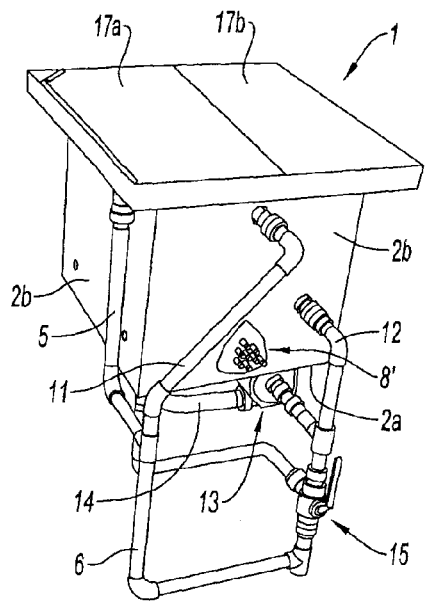
FIG. 2 illustrates a side perspective view of the device of FIG. 1, with its upper face closed by lids.

There is illustrated in FIGS. 1 and 2 a cooking device 1, or cooker 1, according to the preferred embodiment of the invention.

The cooker 1 is, in the present case, a cooking module arranged for being housed in an appropriate place in a kitchen. A kitchen, more particularly a restaurant kitchen, comprises a succession of modules each having a function; the modules include, more particularly, devices for heating—for example gas burner ones—kitchenware such as saucepans, cooking pots or frying pans, ovens, hotplates and devices for cooking by heating a water bath. The cooker 1 is a cooking device by heating a water bath.

The cooker 1 comprises an opened hollow vessel 2. More precisely, the vessel 2 (or enclosure 2) is overall in a parallelepiped shape; it comprises a lower wall 2a (or bottom wall 2a) and four side walls 2b and is opened on its upper part (or face) 2c. The vessel 2 defines an internal volume 3 intended to be filled at least partially with a water bath 3'. The cooker 1 is arranged for heating the water bath 3' for cooking foodstuffs. The internal volume 3 of the vessel 2 here ranges from 28 litres to 36 litres, more generally lower than 50 litres; it is indeed a cooker 1 for use in the commercial catering and not in the food processing industry (otherwise stated, this is not a cooking device for producing large scale consumption products, but a cooker 1 for cooking dishes in a restaurant).

The vessel 2 comprises, at the periphery of its upper aperture 2c, a chute 4, with the function of collecting possible overflows from the vessel 2 and the condensates generated by the cooking of foodstuffs overflowing outside the internal volume 3 of the vessel 2. In the chute 4 there is arranged a hole 4a connected with a duct 5, being in turn connected with a dump duct 6 communicating with a water evacuation circuit.

In the vicinity of the bottom wall 2a of the vessel 2 (and parallel to the latter) there is mounted a perforated metal sheet 7 for protecting a means 8 for heating the water bath 3'; the metal sheet 7 is perforated with a plurality of holes 7'. In the present case, the heating means is a thermoplunger 8, that is an element comprising armoured resistors able to be immerged into water; the thermoplunger 8 delivers a power of approximately 6 kW, more generally from 4 to 8 kW, more generally still lower than 12 kW. It comprises means 8' for connecting with control means as well as an energy source (for example the electrical mains, not shown); the connecting means 8' have here the shape of a platen 8' fixed to a side wall 2b of the vessel 2, connected with the thermoplunger 8 and comprising means for connecting with the controlling means of the thermoplunger 8 (which will be detailed later on) and means for connecting with the electrical mains. The thermoplunger 8 extends under the perforated metal sheet 7 and emits heat, via the holes 7' of the metal sheet 7, into the internal volume 3 of the vessel 2 containing the water bath 3', into which it is therefore also immerged, the water flowing through the holes 7'. The perforated metal sheet 7 protects the thermoplunger 8 from the food products to be cooked in the water bath 3', but also protects said products from the thermoplunger 8, preventing them from being directly submitted to the heat from the thermoplunger 8, said heat propagating into the bath through the holes 7'.

The cooker 1 comprises a solenoid valve 9, opening into the vicinity of the upper edge of a side wall 2b. The solenoid valve 9 is connected, via a duct 9', to a water supply source, not shown, and is controlled for being able to fill the vessel 2 with water. The solenoid valve 9 also comprises manual operating means, not shown, allowing to fill the vessel 2 manually, independently from any electrical command of the solenoid valve 9.

The cooker 1 comprises a means 10 for controlling the water level in the bath 3'. This is, in the present case, a probe 10, fixed to a side wall 2b of the vessel 2 and arranged so as to detect that the liquid has reached the height at which it is fixed on the wall 2b. In the present case, the probe 10 is connected with an electric current generator and comprises electrical current conductive means; when the water reaches its level, the probe 10 is brought into contact with water, being a conductor; a current is then created between the probe 10 and another element (which could be the ground), (it is contemplated that such a current be low), forming the signal that the level of the probe (threshold level) is reached by water. Such knowledge of the water passage (in one direction or the other) by such a threshold level makes it possible to automatically control other elements of the cooker 1, such as the solenoid valve 9 and/or the thermoplunger 8. For example, when the threshold level is reached by water, the device 1 could pick up the information from the probe 10 and instruct the solenoid valve 9 to stop filling the vessel 2 with water. For example still, if the water level goes down under the threshold, the supply of the thermoplunger 8 could be cut off in order to prevent it from heating too a low volume of water (or no water), for safety reasons.

The cooker 1 comprises, on one of its side walls 2b, preferably the wall opposite the wall from which the solenoid valve 9 opens into (in order to enhance a possible water circulation from the solenoid valve 9), a hole to which is connected a duct 11 connected with the dump duct 6. Such a hole is located at a height beyond which it is not desired that the water should rise in normal operation.

The cooker 1 further comprises means for homogenizing the bath water 3'. In the present case, such means comprise a pump 13 for homogenizing the bath water 3'. In the described embodiment, such a pump 13 is a circulation pump, allowing the bath water 3' for circulating in a closed loop. To this end, the cooker 1 comprises a hole arranged in a side wall 2b, to which is connected a water outlet duct 12. Such a duct 12 is connected with the water circulation pump 13, being in turn connected with a water inlet duct 14, opening into the vessel 2 at the level of a hole arranged on its lower wall 2a (preferably in the vicinity of the side wall 2b opposite the side wall 2b into which opens the water outlet duct 12). When being actuated, the pump 13 drives the water, in a closed loop, from the inlet duct 14 in the internal volume 3 of the vessel 2 and from the internal volume 3 of the vessel 2 to the outlet duct 12 and to the pump 13. It is understood that the direction could be inverted. The advantage of an inlet duct 14 connected with the bottom 2a of the vessel 2 and of an outlet duct 12 connected with a side wall 2b is that the water circulation in the vessel 2 occurs from the thermoplunger 8 to the foodstuffs to be cooked, thereby improving the thermal exchanges with them.

The inlet duct 14 and the outlet duct 12 are both connected (via a duct) with a discharge valve 15, being, in turn, connected with the evacuation circuit to which is connected the dump duct 6. Such a discharge valve 15, when being opened, allows for emptying the whole assembly of the vessel 2 and the ducts of the cooker 1.

The cooker 1 comprises a grid 16, being able to be clamped in the peripheral chute thereof 4. The grid 16 is removable and allows foodstuffs to be steam cooked: to this end, foodstuffs are placed on the grid 16 and the water bath 3' placed under the latter is brought to boil. Other foodstuffs supporting or containing kitchenware, preferably removable, could be arranged in the cooker 1 (for example baskets allowing to immerge foodstuffs and to remove them easily from the water bath 3').

The cooker 1 comprises two half-lids 17a, 17b, also removable, able to close the upper face 2c of the vessel 2. Such half-lids 17a, 17b fill two purposes: when the cooker 1 is not being used, they protect it; when the cooker 1 is in operation, they allow to close the internal volume thereof 3, for example for storing steam in a steam cooking process; allowing, on the one hand, to improve the yield and on the other hand, to store (partially) the available water volume in the vessel 2.

The cooker 1 comprises a means 18 for measuring the temperature of the bath water 3', in the present case a probe 18. Such a probe 18 is preferably mounted in the vicinity of the foodstuffs to be heated, in the present case in the so-called "outlet" duct 12 of the water circulation closed loop, in the vicinity of the side wall 2b onto which said duct 12 is fixed: thereby, the measured temperature effectively corresponds to the temperature to which are submitted the foodstuffs to be cooked, as the water the temperature of which is measured has just flown in the vicinity of said foodstuffs.

The cooker 1 also comprises a means 19 for measuring the "medium cooking" temperature of the foodstuffs. The expression "medium cooking temperature" of a foodstuff means the temperature being reached within the foodstuff; such a temperature is in the present case measured by means of a probe 19, having the form of a thin stem at the free end of which is mounted a temperature sensor. There is illustrated on FIG. 3 a foodstuff 20 to be heated, in the present case, a piece of meat. The stem 19 is stuck into the foodstuff 20 for knowing the medium cooking temperature thereof by means of its end sensor.

The cooker 1 comprises means for setting the power of the thermoplunger 8 and also means for setting the temperature of the bath 3'. Such setting means are controlled by a control circuit 21, comprising amongst others, a microprocessor and various electric and electronic components for the control of the various elements of the cooker 1 and the analysis of data they supply to the latter. Components as such of the control circuit 21 are known or easy to determine by those skilled in the art and will therefore not be described in detail; only the control functions of the control circuit 21 will be described, those skilled in the art being able to readily determine the nature and the arrangement of components allowing to perform one or another function.

Figure 3:
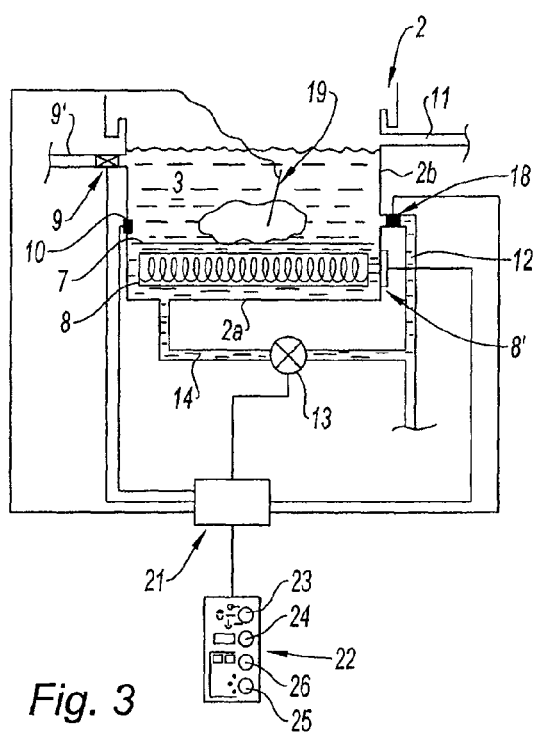
FIG. 3 illustrates a functional scheme of the cooking device of FIG. 1 and its control circuit.
Figure 4:
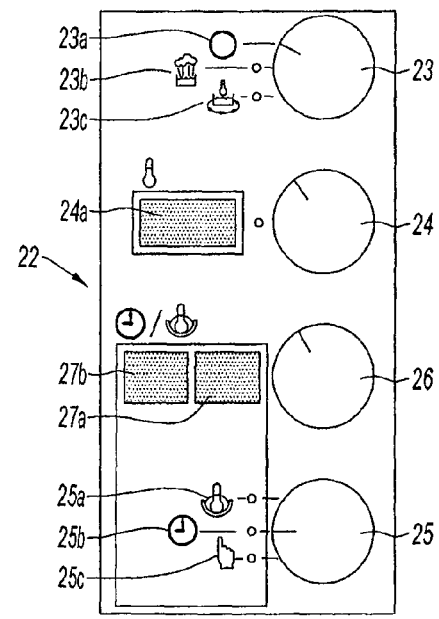
FIG. 4 illustrates a schematic front view of the control panel of the control circuit of the device of FIG. 1.

The control circuit 21 is fixed, by appropriate means such as cables or webs (schematically illustrated by lines connecting the elements in FIG. 3), to the solenoid valve 9, to the pump 13, to the connecting platen 8' of the thermoplunger 8, to the probe 10 for controlling the level of water, to the probe 18 for measuring the temperature of the water and to the probe 19 for measuring the medium cooking temperature of foodstuffs. The control circuit 21 could collect information from elements to which it is connected and control such elements. The control circuit 21 is further connected to a control panel 22, enabling the user of the cooker 1 to set the parameters of the cooker 1 for a determined cooking mode and thus, to give to the control circuit 21 the parameters to follow in its control of the various elements of the cooker 1. It is thus, actually, a control panel 22 for the control circuit 21.

The cooker 1 allows for at least three different cooking modes: cooking through immersion into a boiling bath, steam cooking and low temperature cooking. A description of each of said cooking types and of the parameters relating to them will now follow.

Cooking through immersion into a boiling bath is a cooking mode through immersion of the foodstuffs to be cooked 20 into a water bath brought to boil; foodstuffs 20, immersed into the bath 3', are cooked by heat conveyed by water. Typically, cooking through immersion into a boiling bath allows to cook pasta or rice. The temperature of the boiling bath water 3' being constant and equal to 100° C., the main characteristic of a cooking through immersion into a boiling bath is the nature of the whirl, that is the volume of steam bubbles formed in the water bath 3' and the number thereof. The main setting parameter of the whirl is the power of the thermoplunger 8: the more important the power of the thermoplunger 8, the more significant the whirl is.

Steam cooking is a cooking mode wherein the foodstuffs are not in direct contact with water. Foodstuffs are placed on a support, for example the grid 16 in FIG. 1, extending above the water level. Water is heated and brought to boil; the evolved steam comes into contact with foodstuffs and cooks them. The half-lids 17a, 17b can be closed for confining the steam inside the volume 3 of the vessel 2. The main characteristic of a steam cooking mode is the flow rate of steam. The main parameter allowing for an impact on such a flow rate of steam is the power of the thermoplunger 8: the higher the power of the thermoplunger 8 is, the higher the amount of bubbles being formed in the water bath 3' is and the higher the amount of steam is generated.

Low temperature cooking is a cooking mode through immersion of foodstuffs, for some period of time, into a water bath heated at a temperature close to or equal to the temperature being desired in fine for obtaining medium cooked foodstuffs 20 (as opposed to cooking through immersion into a boiling bath, wherein foodstuffs are immerged into some water at 100° C., but are removed from water before reaching such a temperature). The main characteristic of a low temperature cooking mode is thus the temperature for medium cooking as reached by the foodstuff and/or the temperature of water into which it is being immerged. Such a characteristic is not controlled the same way as the whirl of a cooking through immersion operation in a boiling bath; indeed, it is not satisfactory to simply set the power of the thermoplunger 8, but to control a set point temperature. The energy will therefore have to be controlled, as being supplied by the thermoplunger 8 over time by means of a slave circuit managed by the control circuit 21. The control of the thermoplunger 8 could be slaved, either by the temperature of the bath water 3' (measured by the probe 18), or by the medium cooking temperature of the foodstuff (measured by the probe 19). By means of such a slave system, the temperature of the bath water 3' is controlled.

Low temperature cooking, being initially used in the food industry, is from now on used in commercial cooking, and more particularly in gastronomic cooking. Using such a cooking mode, dishes could be, for example, cooked the day before being served, placed in vacuo (raw) in a plastic pocket and immerged into a bath, set at their desired cooking temperature, during the night before their service. Indeed, as the cooking state of a foodstuff does not depend upon the temperature being reached by the foodstuff, but upon the time it remains at such a temperature, it is not required to monitor foodstuffs that could be left without any risk all night in the water bath 3' having its temperature under control; when these are recovered, their cooking state is being ensured.

For clarity reasons and by way of an illustration, an example of medium cooked temperatures is given corresponding to various cooking states of a piece of beef meat. The so-called "underdone" cooking state is achieved for a temperature of 53° C.; the so-called "rare" cooking state is achieved for a temperature of 54° C.; the so-called "pink" cooking state is achieved for a temperature between 55 and 56° C.; finally, the so-called "done" cooking state is achieved for a temperature between 57 and 58° C. Thus, a piece of meat immerged for a long period of time into some constant temperature water equal to a given temperature (or "set temperature") will reach and maintain the corresponding cooking state.

Obviously, the low temperature cooking mode could be implemented in a more elaborated way than only maintaining a constant temperature. For example, changing the temperature of the water bath 3' could be implemented during the cooking process, allowing for the cooking to accelerate starting from a higher temperature than the temperature to be reached and progressively reducing or step by step the temperature of the water bath 3' as the medium cooking temperature of foodstuffs comes closer to the temperature to be reached. Processes for following hygiene standards, for example for allowing the foodstuffs to be pasteurized submitting the latter for some period of time to a given temperature, could also be implemented. Such processes could use, as a parameter allowing for the control of the temperature of the water bath 3', the temperature of the bath water 3' and/or the temperature of medium cooked foodstuffs 20.

In fact, a low temperature cooking mode is a cooking operation through immersion of foodstuffs, for some period of time, into a controlled temperature water bath, the value of the temperature of the bath being lower than the water boiling temperature. Such water controlled temperature could vary during the process.

Controlling the temperature occurs via means for controlling the temperature of the bath water 3' (comprising the probe 18 and the thermoplunger 8) and via means for homogenizing the bath water 3' (comprising the pump 13), the latter ensuring the standardization of the temperature control, that is the setting thereof. Thus, the water temperature is controlled by means of the controlling device, by the control circuit 21, of the heating of the thermoplunger 8, such a control being slaved by the measurement, by the probe 18, of the temperature of the bath water 3'. The pump 13, homogenizing the bath water 3', ensures the distribution of its heating and ensures that the measured temperature is uniform; it allows thus, in combination with means for controlling the temperature, some control of the temperature.

Le control panel 22 of the cooker 1 comprises a first button 23 for selecting a cooking mode. The first button 23 could be positioned in a deactivating position 23a of the cooker 1, in a "power control" position 23b (wherein the power of the thermoplunger 8 is controlled, for implementing a cooking process through immersion into a boiling bath or a steam cooking process) and in a "temperature setting" position 23c (allowing to implement a low temperature cooking process).

The control panel 22 comprises a second button 24, for controlling a parameter of the cooking mode selected at the level of the first button 23; the second button 24 could be rotated continuously between two extreme positions and the value of the parameter to be set appears on a display screen 24a, for example of the LCD type. Thus, in the "power control" mode (position 23b), the second button 24 allows to set the power of the thermoplunger 8 (on a scale from 1 to 10, for example); in such a mode, the water circulation pump 13 is deactivated; the power of the thermoplunger 8 could be controlled and not vary during the cooking operation; according to another embodiment, varying the power of the thermoplunger 8 during the process could be programmed in advance (although this is not anyway a low temperature cooking process, as there is no temperature control). In the "temperature control" mode 23c, the second button 24 allows to control the set temperature of the water bath 3' (from 0 to 90° C. for example); in such a mode, the pump 13 is activated for leading to a forced circulation of water in a closed loop; the control circuit 21, depending upon the registered set temperature and the data it receives from the various elements to which it is connected (including the probe 18 for measuring the temperature of the water bath 3' and optionally the probe 19 for measuring the medium cooking temperature of the foodstuff 20 and the probe 10 for controlling the water level), controls during the whole process the thermoplunger 8 for obtaining a controlled temperature of the bath (constant or progressive, as explained hereinabove).

The control panel 22 comprises a third button 25 for selecting an additional parameter allowing for the end of the cooking operation to be controlled. Such a third button 25 makes it possible to choose between a control position 25a of the temperature required to be reached within the foodstuff 20, a position 25b for controlling a timer and a manual mode position 25c (wherein the cooker 1 is not deactivated automatically when a value of a parameter is reached). The third button 25 is combined with a fourth button 26, for controlling the threshold value of the parameter selected by the third button 25 (medium cooking temperature or cooking time); when such a threshold value is reached, the cooker 1 is deactivated. The parameter to be controlled by the fourth button 26 appears, if this is the medium cooking temperature, on a first display screen 27a (and could be controlled for example on a scale from 20 to 80° C.), if this is the timer, on a second display screen 27b (and could be controlled for example in minutes); screens 27a, 27b could be of the LCD type. It could be contemplated that both parameters be controlled in parallel, the first threshold value being reached by a parameter resulting in the deactivation of the cooker 1.

Obviously, buttons 23-26 are connected with electronic means for selecting or controlling the relevant parameters in the control circuit 21.

The user of the cooker 1 sets the mode and the parameters of its cooking operation on the control panel 22. Such choices are transmitted to the control circuit 21 which is then able to control the cooking process.

It is understood that the control circuit 21 could fill other control functions, such as stopping the heating of the thermoplunger 8 if the level as measured by the probe 10 controlling the water level indicates to it too a low level, or even the control of the solenoid valve 9 for filling the vessel 2 if the water level indicated by the probe 10 is too low. All controls as allowed by electric and electronic means could be contemplated.

In the "temperature control" mode, the homogenizing function of water, obtained by means of the pump 13, is triple: on the one hand, it allows to ensure good thermal exchanges between water and the foodstuffs to be cooked 20, on the other hand, it allows to provide a uniform distribution of the heat of the thermoplunger 8, and on the other hand still, it allows to ensure that the temperature as measured by the probe 18 for measuring the water temperature is indeed representative of the temperature of the bath water 3' to which the foodstuffs to be cooked 20 are actually submitted. Such a homogenizing means 13 is therefore an essential element for implementing a low temperature cooking process; it is combined with means for controlling the bath temperature for allowing and ensuring the control of the temperature.

As set forth herein above, means for controlling the bath temperature 3' comprise here the thermoplunger 8 and the probe 18 for measuring the bath temperature 3', controlled by the control circuit 21. Such means for controlling the bath temperature could be additionally completed by the probe 19 for measuring the medium cooking temperature of the foodstuffs to be cooked 20, allowing for an additional parameter to be chosen for controlling temperatures within the vessel 2 of the cooker 1.

For better still understanding the difference between "power control" and "temperature control", a simple example will now be described of the control of the thermoplunger 8 in both cases. In a "power control" method, the thermoplunger 8 is set on a given power (for example its maximal power), remaining constant or not, and generates a more or less high boiling value of water (remaining at 100° C.), as a function of its power. In a "temperature control" process, a set temperature is controlled, for example equal to 60° C.; the thermoplunger 8 is only activated when the bath temperature 3' decreases (slightly) under 60° C., followed by an increase, and is stopped when it is reached (the information on the temperature coming from measurements carried out by the probe 18); thereby the thermoplunger 8 has an "erratic" operation, alternating heating and deactivating periods; this resulting in water being controlled at 60° C. and not being more or less boiling.

Obviously, and as explained herein above, the bath temperature could be controlled for being constant or progressive (step by step or continuous)

The cooker 1 of this invention is actually a multi-purpose cooker by heating a water bath, allowing cooking through immersion into a boiling bath, steam cooking and low temperature cooking, in a commercial catering application that is with rather low volume and power (for example approximately 28 to 36 litres for the vessel and approximately 4 to 8 kW for the thermoplunger, more generally lower than 50 litres for the vessel and lower than 12 kW for the thermoplunger); otherwise stated, this is a module that it not intended for the food processing industry scale and that could be placed in a kitchen.

An illustrative example could be given of the use of the cooker 1.

The day before operation in a restaurant, dishes are prepared in vacuo in plastic pockets placed in the water bath 3' and the cooker 1 is set, by means of the control panel 22, on a low temperature cooking mode. Foodstuffs are cooked during the night at a low temperature; in the low temperature mode, the pump 13 is activated and the thermoplunger 8 actuated for controlling the temperature as a function of data received from the probe 18 of the control circuit 21. The user recovers the cooked foodstuffs the next morning and puts them in a fast cooling cell allowing them to well be stored and ready for use. The user can then cook foodstuffs in the cooker 1, for example vegetables, ready for lunch service, the vegetables being ready for steam cooking by means of the control of the cooker 1, on the control panel 22, in a "power control" mode, allowing to generated some significant boiling and therefore, a good steam flow rate; in the "power control", the pump 13 is deactivated. Customers then show up. Pasta could be prepared through direct immersion of a basket containing them in the vessel 2, for an immersion cooking operation in a boiling bath with the cooker 1 being still in the "power control" mode of the thermoplunger 8. For cooking pasta, it is generally preferred to open (manually) the solenoid valve 9, so that a flow rate of flowing water flows from the solenoid valve 9 to the dump duct 11, avoiding the reaction of water with the pasta starch, likely to result in foam and the water bath 3' overflowing; in any event, any overflow is recovered in the peripheral channel 4. It is to be noticed that cooking through immersion into a boiling bath and steam cooking could be combined, foodstuffs being placed both in the water bath 3' and on the grid 16. When about to serve customers, the user places the plastic pocket containing a dish prepared during the night into the water bath 3' for reheating it. He can then serve the various foodstuffs.

The cooker of this invention has been presented in relation with a probe 10 for controlling the level of water placed at a determined height, but it is obvious that the cooker 1 could comprise a plurality of probes, each at a determined height, or still a probe able to rise various heights of the water level, even determine any value of the water level.

This invention has further been set forth in a preferred embodiment, wherein the means for controlling the bath temperature are slaved by a measurement of the bath temperature, the measurement of the medium cooking temperature of foodstuffs to be cooked forming an additional control parameter and optionally, a deactivating parameter of the cooker 1. According to another embodiment, controlling the bath temperature occurs by means of a measurement of the medium cooking temperature of foodstuffs (without necessarily taking a measurement of the bath temperature); indeed, the temperature of the bath and the temperature of foodstuffs being immerged in the latter are tightly related, and knowing one of them makes it possible to know the other (by means of empirical models for example). In such a case, means for controlling the temperature of the bath comprise means for heating the bath (thermoplunger 8), means for measuring the medium cooking temperature of foodstuffs (probe 19) and controlling means (control circuit 21).

This invention has been set forth in relation with the various elements of the cooker 1 connected to control means (control circuit 21) by cables or webs. It is understood that any other type of functional link could be contemplated, for example wireless means.

The invention claimed is:

1. A multi-purpose device for cooking through heating a bath water, comprising: a vessel for containing bath water, said vessel having a peripheral chute and an inlet on a bottom wall and an outlet on a side wall, a thermoplunger for heating the bath water and a control circuit for controlling the heating power, arranged so as to provide for cooking foodstuffs through immersion in the boiling water bath, a grid for supporting foodstuff on the grid and disposed above said water bath for steam cooking, said grid is removably attached to said peripheral chute, and a pair of half-lids for confining steam inside said vessel, wherein said device further comprises a temperature controller for controlling the temperature of the bath water and a pump for homogenizing the bath water through said inlet and said outlet for allowing for a low temperature cooking operation in the same water bath contained in the water bath vessel.

2. The multi-purpose device according to claim 1, comprising means for controlling setting means and homogenizing means.

3. The multi-purpose device according to claim 2, wherein the means for controlling the temperature of the bath water comprise means for measuring the temperature of the bath water and means for heating the bath water, connected with the means for controlling the heating power.

4. The multi-purpose device according to claim 2, comprising means for measuring the medium cooking temperature of foodstuffs, connected with the means for controlling the heating power.

5. The multi-purpose according to claim 2, comprising a circuit for controlling the device, comprising the control means.

6. The multi-purpose device according to claim 1, comprising means for selecting a cooking mode and means for controlling a parameter of the selected cooking mode.

7. The multi-purpose device according to claim 6, wherein the means for selecting a cooking mode are arranged so as to allow for choosing between at least one first cooking mode with power setting of the heating means and a second cooking mode with steam setting of the temperature of the water bath.

8. The multi-purpose device according to claim 1, comprising means for selecting at least one parameter allowing to control the end of the cooking operation.

9. The multi-purpose device according to claim 8, wherein the parameter is the temperature required to be reached with foodstuffs to be cooked in the device or the cooking time.

10. The multi-purpose device according to claim 1, further comprising a control circuit for controlling the temperature controller and the pump.

11. The multi-purpose device according to claim 10, wherein the control circuit is connected to the temperature controller and the thermoplunger.

12. The multi-purpose device according to claim 2, further comprising a control circuit connected to the pump.

13. The multi-purpose device according to claim 1, wherein the peripheral chute comprising a hole connected to a duct such that overflows from the vessel is drainable.

14. The multi-purpose device according to claim 1, further comprising a perforated metal sheet having a plurality of holes, wherein the perforated metal sheet is mounted horizontally above the thermoplunger, such that heat emitted by the thermoplunger propagates into the vessel through the holes.

15. The multi-purpose device according to claim 1, further comprising a solenoid valve connected to a water supply source and a probe for detecting the water level in the vessel, such that the solenoid valve adjusts a filling feature of the vessel based on data from the probe.

16. A multi-purpose device for cooking through heating a bath water, comprising:
- a vessel for containing bath water, said vessel having a peripheral chute and an inlet on a bottom wall and an outlet on a side wall;
- a thermoplunger for heating the bath water; and
- a control circuit for controlling the heating power, wherein
- the device is configured so as to provide for cooking foodstuffs through immersion in the water bath and through steam cooking,
- the device further comprises a grid for supporting foodstuff on the grid,
- the grid is disposed above said water bath for steam cooking,
- the grid is removably attached to said peripheral chute,
- the device comprises a pair of half-lids for confining steam inside said vessel,
- the device comprises a temperature controller for controlling the temperature of the bath water and a pump for homogenizing the bath water through said inlet and said outlet for allowing for a low temperature cooking operation in the same water bath contained in the water bath vessel.

* * * * *